United States Patent
Gravermann et al.

(10) Patent No.: US 10,027,071 B2
(45) Date of Patent: Jul. 17, 2018

(54) CABLE CONNECTION DEVICE (71) Applicant: 3M INNOVATIVE PROPERTIES COMPANY, St. Paul, MN (US)

(72) Inventors: Mark Gravermann, Erkelenz (DE); Friedrich A. Busemann, Amelinghausen (DE); Gerhard Lohmeier, Cologne (DE); Jens Weichold, Erkelelenz (DE); Bernd Schubert, Cologne (DE); Giuliano Bolcato, Dugnano (IT); Werner Roehling, Hueckelhoven (DE); Michael Petry, Dinslaken (DE)

( * ) Notice: Subject to any disclaimer, the term of this patent is extended or adjusted under 35 U.S.C. 154(b) by 0 days.

(21) Appl. No.: 14/898,801

(22) PCT Filed: Jun. 19, 2014

(86) PCT No.: PCT/US2014/043144
§ 371 (c)(1),
(2) Date: Dec. 16, 2015

(87) PCT Pub. No.: WO2014/209740
PCT Pub. Date: Dec. 31, 2014

(65) Prior Publication Data
US 2016/0134065 A1 May 12, 2016

(30) Foreign Application Priority Data

Jun. 26, 2013 (EP) .................................... 13173764

(51) Int. Cl.
*H01R 24/38* (2011.01)
*H01R 13/53* (2006.01)
(Continued)

(52) U.S. Cl.
CPC ............. *H01R 24/38* (2013.01); *H01R 13/53* (2013.01); *H01R 43/16* (2013.01); *H01R 13/6683* (2013.01); *H01R 2101/00* (2013.01)

(58) Field of Classification Search
CPC ............... H01R 13/53; H01R 13/6485; H01R 13/6683; H01R 24/38; H01R 43/16; H01R 2101/00; H01R 9/05; Y10S 439/921
(Continued)

(56) References Cited

U.S. PATENT DOCUMENTS 3,617,986 A * 11/1971 Becker .................... H01F 27/04
174/153 R
3,622,940 A * 11/1971 Illies ....................... H01F 27/40
174/18
(Continued)

FOREIGN PATENT DOCUMENTS

DE 3611463 10/1987
DE 3709943 10/1988
(Continued)

OTHER PUBLICATIONS

International Search report for PCT International Application No. PCT/US2014/043144 dated Nov. 17, 2014, 3 pages.
(Continued)

*Primary Examiner* — Tulsidas C Patel
*Assistant Examiner* — Travis Chambers
(74) *Attorney, Agent, or Firm* — Gregg H. Rosenblatt (57) ABSTRACT

Cable connection device for connecting a power cable to an electrical installation of a power network, comprising a conductor element having a first end portion, a second end portion, and a middle portion disposed between the first and the second end portion. The conductor element comprises a
(Continued)

connector socket arranged at the first end portion, for mating with a cable plug. The connector socket is integrally formed with the middle portion.

16 Claims, 5 Drawing Sheets

(51) Int. Cl.
*H01R 43/16* (2006.01)
*H01R 13/66* (2006.01)
*H01R 101/00* (2006.01)

(58) Field of Classification Search
USPC .................. 439/578, 181, 854, 921, 13, 14
See application file for complete search history.

(56) References Cited

U.S. PATENT DOCUMENTS

| | | | |
|---|---|---|---|
| 4,260,214 A * | 4/1981 | Dorn | H01R 13/53 439/185 |
| 4,867,687 A * | 9/1989 | Williams | H01R 13/53 439/10 |
| 5,114,357 A * | 5/1992 | Luzzi | H01R 13/53 439/183 |
| 5,230,640 A | 7/1993 | Tardif | |
| 6,031,368 A | 2/2000 | Klippel et al. | |
| 6,296,497 B1 * | 10/2001 | Xu | H02G 15/103 439/744 |
| 6,594,133 B1 | 7/2003 | Schmidt | |
| 6,843,685 B1 * | 1/2005 | Borgstrom | H01R 13/53 439/606 |
| 7,316,576 B2 * | 1/2008 | Saito | B60R 16/0239 439/76.2 |
| 7,351,082 B2 * | 4/2008 | Jazowski | H01R 13/53 439/181 |
| 7,445,480 B2 * | 11/2008 | Whyte | H01R 13/53 439/250 |
| 7,503,785 B2 * | 3/2009 | Stepniak | G01R 15/16 439/187 |
| 7,780,488 B2 | 8/2010 | Robertson | |
| 7,803,003 B2 * | 9/2010 | Hughes | H01R 13/53 439/181 |
| 7,811,113 B2 * | 10/2010 | Hughes | H01R 13/53 439/278 |
| 7,878,849 B2 * | 2/2011 | Hughes | H01R 11/26 439/578 |
| 8,109,776 B2 * | 2/2012 | Hughes | H01R 13/46 439/282 |
| 8,152,547 B2 * | 4/2012 | Hughes | H01R 13/46 439/282 |
| 8,475,194 B2 * | 7/2013 | Bertini | H01R 13/005 439/290 |
| 2005/0142941 A1 * | 6/2005 | Borgstrom | H01R 13/53 439/606 |
| 2006/0216992 A1 * | 9/2006 | Hughes | H01R 13/53 439/607.01 |
| 2008/0026623 A1 | 1/2008 | Emerson | |
| 2009/0255106 A1 | 10/2009 | Hughes | |
| 2009/0258547 A1 * | 10/2009 | Hughes | H01R 11/26 439/730 |
| 2011/0189887 A1 * | 8/2011 | Borgstrom | H01R 3/00 439/488 |
| 2013/0303030 A1 * | 11/2013 | Garabieta Artiagoitia | H01R 13/6683 439/676 |
| 2014/0273540 A1 * | 9/2014 | Brown | H01R 39/64 439/13 |
| 2016/0134094 A1 * | 5/2016 | Wentzel | H02G 1/14 174/74 R |

FOREIGN PATENT DOCUMENTS

| | | |
|---|---|---|
| EP | 1010226 | 6/2000 |
| EP | 1391740 | 2/2004 |
| EP | 2466708 | 6/2012 |
| JP | 1054369 | 3/1989 |
| JP | 1055009 | 3/1989 |
| JP | 2001-118707 | 4/2001 |
| WO | WO 98/05098 | 2/1998 |
| WO | WO 2013/05475 | 1/2013 |

OTHER PUBLICATIONS

Chinese Search Report for Chinese Application No. 201480036701.9, dated Feb. 8, 2017, 2pgs.
EP Office Action for Application No. 13173764.5, dated Sep. 27, 2016, 1pg.

* cited by examiner

CABLE CONNECTION DEVICE

The invention relates to devices, such as, for example, separable connectors or terminations, for connecting power cables to electrical installations in electrical power networks like, for example, in national grids. It also relates to cable assemblies comprising such cable connection devices, and to power networks comprising such cable assemblies.

Traditionally, power cables are connected to installations of electrical networks by cable connection devices like cable terminations or separable connectors like elbow plugs or T-bodies. Such connection devices normally provide a central conductor element, one end of which is equipped with a connector for connection to the power-carrying conductor of the cable directly or via a cable plug on the end of the conductor, while an attachment member such as a cable lug is attached to the other end. One or more layers of electrically conductive, semiconductive and insulating layers is/are arranged around the conductor element for providing electrical stress control, shielding and insulation.

Such a connection device is described, for example, in the European patent EP 0504035 B1. It is described to be for use on one end of an electrical cable and comprises a multilayer sleeve having an axis and having an insulating intermediate layer interposed between two layers capable of providing a guiding an electric field.

The U.S. patent application US 2009/0258547 describes an extender for a separable insulated connector. A conventional cable adapter can be inserted into the extender, which includes a conductive rod for carrying electrical power from the cable to the separable insulated connector. The extender also includes an inner semi-conductive layer that borders the conductive rod and compression connector, an outer semi-conductive layer, and an insulating layer between the two semi-conductive layers. The extender is inserted into the separable insulated connector, which is then connected to the electric power system.

Generally, attaching a connector or a lug to a conductor element of a connection device represents an extra step in the assembly of the connection device, which costs time in manufacturing in a plant or in assembly in the field. Also, an attached connector requires the presence of additional electrical elements in the connection device which reduce electrical stress created by air pockets generated during attachment of the connector. It appears thus generally desirable to provide a connection device that is more cost-effective in production and that is easier to assemble.

The present invention seeks to address such needs. It provides a cable connection device for connecting a power cable to an electrical installation of a power network, the cable connection device comprising a conductor element having a first end portion, a second end portion, and a middle portion disposed between the first end portion and the second end portion, wherein the conductor element comprises a connector socket, arranged at the first end portion, for mating with a cable plug, characterized by the connector socket being integrally formed with the middle portion.

The connector socket being integrally formed with the middle portion of the conductor element avoids an interface between the middle portion and a separate connector socket. Since no interface is present, the cable connection device according to the invention may be mechanically and electrically more reliable than conventional cable connection devices. Also, the absence of an interface may make it easier to provide an insulating layer on the conductor element without creating air pockets between the conductor element and the insulating layer. This, in turn, may make it unnecessary to provide a cage electrode to shield the interface. Such a cable connection device may have a simpler design, may be more cost-effective to manufacture, because less parts are required, and an assembly step of attaching the connector socket with the conductor element is obsolete. In the field, such a cable connection device may also be easier to install, because the connector socket does not need to be attached to the conductor element. Also, such a cable connection device may be more reliable in use, because integrally formed portions of an element are often mechanically more stable than if the element were made of separate parts that are connected with each other.

Generally, a cable connection device having an integrally formed connector socket is easier and more cost-effective to manufacture, because it comprises a smaller number of parts that need to be assembled to form the connection device. As explained above, being integrally formed, the connector socket does not need to be attached to the conductor element. This may allow one to apply an insulating cover, e.g. a jacket, over the conductor element and the connector socket at an earlier stage of the assembly of the cable connection device. This, in turn, may allow a pre-assembly to a higher degree in the factory, leaving less assembly steps to be performed when the cable connection device is installed in the field.

Connection devices according to the present invention are for use with power cables. Power cables, such as high-voltage or medium-voltage power cables, are cables that are adapted to transmit electrical energy from power generators, e.g. power plants, to, for example, households or industry at current levels of 50 Ampere or more. A power cable has a longitudinal extension, which defines axial directions and radial directions, perpendicular to axial directions. A power cable has a power-carrying conductor. It may comprise an insulating layer, arranged around the power-carrying conductor or an axial section of the power-carrying conductor. It may comprise a conductive or semiconductive layer (herein referred to collectively as "(semi-) conductive layer"), arranged around the insulating layer or an axial section of the insulating layer. A power cable may comprise a stripped axial section. In a stripped section, one or more outer layers of the power cable are removed such as to expose an axial section of the power-carrying conductor and/or an axial section of the insulating layer and/or an axial section of the (semi-) conductive layer.

Certain cable connectors cannot receive and mate with an end of the power-carrying conductor of a power cable directly. A cable plug is an adapter, attached to an end of the power-carrying conductor of the cable, which can be received by a cable connector for mating. The plug may be attached to the end of the power-carrying conductor by crimping or by screws, for example.

Generally, a cable connection device according to the invention may be, for example, a separable connector, such as an elbow connector or a T-body or a T-shaped connector, i.e. it has the electrical functionality of a traditional elbow connector, T-body or T-shaped connector. Connection devices of such shapes are used today for connecting power cables to electrical installations. Alternatively, a cable connection device according to the invention may be, for example, a cable termination, i.e. it has the electrical functionality of a traditional cable termination.

A cable connection device according to the present invention comprises a conductor element having a first end portion, a second end portion, and a middle portion, disposed between the first and the second end portion. The conductor element is electrically conductive. It may be operable to transmit electrical power or electrical current between the power cable and the electrical installation of the power network. Generally, the conductor element may be elongate. Certain cross sections of the middle portion may make manufacturing of the conductor element easier or more cost-effective. Generally, the middle portion may have a circular, elliptical or rectangular cross section.

A conductor element of a cable connection device according to the present invention comprises a connector socket at its first end portion. The connector socket can be mated with a cable plug. The connector socket may comprise a receptacle for receiving a portion of a cable plug for mating. The receptacle may comprise, or may be surrounded by, a wall that is integrally formed with the middle portion of the conductor element. The receptacle may be defined or delimited by a wall that is integrally formed with the middle portion of the conductor element.

In certain electrical installations of a power network, it may be desirable to release the power cable from the installation after connecting the cable. Therefore, the connector socket may be adapted for releasable mating with a cable plug. In certain other installations, it may be desirable to connect the cable permanently with the installation. Hence, the connector socket may be adapted or for permanent mating with a cable plug.

In a cable connection device according to the present invention, the connector socket is integrally formed with the middle portion of the conductor element. The connector socket and the middle portion may be a single piece, e.g. a single piece of metal. "Integrally formed" implies that the connector socket and the middle portion were manufactured in one piece, without ever having been separate elements. The connector socket may be machined at a part of the middle portion such as to form the first end portion.

Generally, the first end portion of the conductor element may be integrally formed with the middle portion. In that case, the connector socket may be formed by a part, or all of, the first end portion. More generally, the first end portion may comprise the connector socket.

In certain embodiments of the invention, the conductor element may comprise a conductive rod having first and opposed second end portions and a middle portion, disposed between the first and second end portions, all integrally formed with each other. The middle portion of the rod may form the middle portion of the conductor element. The first end portion of the rod may form the first end portion of the conductor element. The connector socket may be machined out of the first end portion. The second end portion of the rod may form the second end portion of the conductor element.

In order to provide a connector socket that can be mated with a cable plug, other mechanical elements may be attached to the connector socket, e.g. springs, inserts, pins, or similar elements. These elements do not form the socket. The presence of such elements is therefore considered to be no obstacle to the connector socket being integrally formed with the middle portion.

The cable connection serves to connect a power cable to an electrical installation of a power network. The first end portion of the conductor element comprises the connector socket for attaching to the cable. It may be advantageous to use the second end portion for attachment to the installation, because this may make separate elements for attachment to the installation obsolete. Therefore, the cable connection device according to the present invention may comprise attachment means, such as a cable lug, arranged at the second end portion of the conductor element, for attaching the cable connection device to the electrical installation.

The conductor element may be operable for mechanical and electrical connection of a power cable with an electrical installation. Mechanical stability of the conductor element is essential for a reliable connection. Integrally formed portions of an element often provide high mechanical stability. Also, integrally formed portions often provide a low resistance to electrical current, compared to separately formed portions which are attached to each other. Hence, the attachment means may be integrally formed with the middle portion. Generally, the second end portion of the conductor element may be integrally formed with the middle portion. In that case, the attachment means may be formed by a part, or all of, the second end portion. More generally, the second end portion may comprise the attachment means. This may provide a space-saving arrangement of the attachment means and may also be advantageous to obtain mechanical stability of the conductor element and of the connection formed between the electrical installation and the cable connection device.

It is often advantageous to electrically insulate and/or mechanically protect a conductor element of a cable connection device by an element that is arranged around at least parts of the conductor element. Electrical insulation prevents direct contact with the conductor element and provides a degree of safety. Any type of envelope may reduce the risk of corrosion of the conductor element. Therefore, a cable connection device according to the present invention may comprise a jacket. The jacket may be arranged around at least a part of the middle portion and at least a part of the first end portion. Alternatively, the jacket may be arranged around the entire conductor element.

Generally, the jacket may comprise an electrically insulating layer. The insulating layer may be arranged such as to surround at least a part of the middle portion or at least a part of the first end portion or both. If the jacket arranged around the entire conductor element, the insulating layer may be arranged such as to surround at least a part of the middle portion and/or at least a part of the first end portion and/or at least a part of the second end portion. The insulating layer may be arranged such as to surround the entire conductor element.

Once a power cable with a cable plug attached is connected to the cable connection device by mating the cable plug with the connector socket, it is advantageous to protect the stripped section of the cable and to prevent water, humidity, dust and dirt from entering the cable connection device. A jacket as described above, that extends in an axial direction beyond the conductor element may protect the cable connection device. Generally, the jacket may comprise a cover portion extending axially beyond the first end portion of the conductor element. The jacket may extend axially beyond the cable plug on the end of the power-carrying conductor of the cable, when the cable plug is mated with the connector socket. The jacket may extend axially beyond the first end portion of the conductor element up to an unstripped axial section of the cable.

Generally, it is often desirable to reduce the risk of air pockets in a cable connection device for a power cable, because air pockets can cause electrical partial discharges, which may lead to damage in the cable or in the connection device. Also, after being connected to a cable, a cable connection device advantageously is sealed against water, humidity, dust and dirt entering the device. It is also often desirable that the connection device occupies as little space as possible. A jacket that is shrinkable after mating the cable plug to the connector socket may drive out air when shrunk and thereby help avoiding air pockets. It may provide sealing, because after shrinking it conforms tightly around the element underneath. Thus, independent of the extension of the jacket, the jacket may comprise a shrinkable material. The shrinkable material may be a cold-shrinkable material or a heat-shrinkable material. The shrinkable material may be elastic. It may comprise silicone or EPDM (ethylene propylene diene monomer). Only a portion of the jacket may comprise shrinkable material. Specifically, if the jacket has a cover portion as described above, the cover portion may comprise a shrinkable material.

Some traditional cable connection devices required assembly in the field, where a jacket had to be fitted around a conductor element shortly before installation of the connection device. Assembly in the field is potentially time-consuming and error-prone, because air pockets are likely to occur. Molding is a cost-effective method of manufacturing a part of the jacket on the surface of the conductor element with minimal risk of producing air pockets between the jacket and the conductor element. Molding a part of the jacket on the conductor element provides a connection device that is preassembled to some degree, and that reduces the risk of air pockets. Molding cannot be done in the field. Hence, the jacket as described above may comprise a molded element. The molded element may be molded on at least a part of the middle portion and/or at least a part of the first end portion of the conductor element.

The cable plug and the connector socket in a cable connection device according to the present invention, when mated, will have air pockets in the vicinity of the interface surfaces. These are due to mechanical tolerances and imprecisions in the elements. Similarly, air pockets are likely to occur where the conductor of the cable is attached to the cable plug. In use, the high potential difference between the plug-socket assembly and ground or between the cable-plug assembly and ground is likely to result in partial discharges where such air pockets occur. These can damage the connection device, the cable plug, or the cable. Creating a Faraday cage around the plug-socket assembly and ground or between the cable-plug assembly eliminates the high field strength within the Faraday cage and thus reduces the risk of partial discharges. An electrode, a "cage electrode", electrically connected to the connector socket and thus on high voltage, which surrounds the plug-socket assembly or the cable-plug assembly or both, can help to minimize the risk of partial discharges in those areas. A cable connection device according to the invention may therefore comprise an electrically conductive or semiconductive cage electrode. The cage electrode may be arranged around at least a portion of the connector socket. The cage electrode may comprise a portion which is arranged on the connector socket. The cage electrode may be electrically connected to the connector socket.

In order to monitor the state of a power network, measuring voltage or current or both is necessary. A cable connection device according to the present invention may thus comprise a sensing electrode. The sensing electrode may be operable as an electrode of a sensing capacitor for sensing a voltage of the power-carrying conductor of the power cable. The sensing electrode may be a first capacitor electrode of a sensing capacitor, which comprises the power-carrying conductor or an extension of the power-carrying conductor as the second capacitor electrode, and a portion of an electrically insulating layer of a jacket of the connection device as a dielectric. The sensing capacitor may be the first dividing capacitor of a capacitive voltage divider, which comprises a second dividing capacitor. The capacitive voltage divider may be comprised in a voltage sensor for sensing the voltage of the power-carrying conductor of the power cable.

In a cable connection device according to the present invention, the conductor element is on the same electrical potential as the power-carrying conductor of the cable. In order to measure the voltage of the power-carrying conductor with a high precision, the sensing electrode may be advantageously placed in the vicinity of the connector socket. Generally, at least a portion of the sensing electrode may be arranged radially outward of at least a portion of the connector socket. Specifically, the entire sensing electrode may be arranged radially outward of the connector socket. The sensing electrode may, for example, comprise an electrically conductive film or foil, a metallized film or foil, or a metal film or foil.

Mostly, power cables are stiff and resistant to torsion. Electrical installation require a specific angular orientation of the attachment means, e.g. a lug, of the connection device for attaching the connection device to the electrical installation. Often, during installation of a traditional cable connection device, the cable is connected to the connection device before the connection device is connected to the electrical installation. In traditional connection devices, the connection device and the cable cannot be rotated with respect to each other. For this reason, the traditional connection device requires a precise angular positioning of the connection device on the cable end, such that later the connection device is in the correct angular orientation for connection to the electrical installation. In connection devices, in which the cable plug is mated with a connector in a permanent, irreversible manner, an error in the angular positioning of the connection device relative to the cable forced the cutting of the cable and installation of a new connection device. It is desirable to reduce the risk of incorrect angular orientations and the resulting damage.

Therefore, the connector socket of a cable connection device according to the invention may be adapted such that the cable plug, when mated with the connector socket, can be rotated relative to the connector socket. The connector socket may, for example, comprise a plurality of electrically conductive lamellae, arranged in an inclined manner for engaging with corresponding notches in the cable plug and for retaining the cable plug in the connector socket. A radially inner edge of a lamella may be arranged in a geometric plane which is oriented perpendicular to the direction, in which the cable plug can be inserted into the connector socket for mating, i.e. perpendicular to the insertion direction.

The cable plug is attached to the cable end. Since the cable plug can be rotated, the cable can be rotated relative to the connection device, or in other words, the connection device can be rotated relative to the cable. Such a connector socket allows mating of the cable plug with the connector socket in any angular orientation. In a second step, the connection device can be connected with the electrical installation. This requires less effort, because the angular orientation of the connection device relative to the cable can be adjusted—without torsion of the able—such that the connection device can be easily connected to the electrical installation. If the cable connection device comprises a jacket comprising a shrinkable material, in a third step, the jacket can be shrunk down, which fixes the angular orientation of the connection device relative to the cable. The connector socket may comprise lamellae, for providing secure mating with a cable plug and allow for rotation of the cable plug.

The rotation of the connection device relative to the cable is particularly advantageous if the connection device can be rotated about an axis which is defined by the direction in which the cable plug is inserted into the connector socket for mating. This results in maximum flexibility during installation. A cable connection device in which the cable plug can be rotated relative to the connector socket as explained above, may have a connector socket which defines an insertion direction, in which direction a cable plug can be inserted into the connector socket for mating, and wherein the connector socket is adapted such that the cable plug, when mated with the connector socket, can be rotated relative to the connector socket about an axis parallel to the insertion direction.

Mating between the cable plug and the connector socket can, in principle, be done by attaching the plug to the socket using tools and/or fixation means, e.g. by tightening a screw or by crimping. However, the connector socket of a cable connection device may be difficult to access, because it might be covered by a jacket. An automatic mating would be more desirable, because it may not require manual operations with tools or fixation means in inaccessible locations for mating. In a connection device according to the invention, the connector socket may be adapted to be permanently mated with the cable plug by inserting the cable plug into the connector socket. The mere action of insertion of the cable plug into the connector socket may create a permanent mating. This can be achieved, for example, by a latch mechanism in the socket.

In many electrical installations, space is scarce. It is therefore often an advantage for a cable connection device to be short, i.e. have a short extension in the direction of insertion of the cable plug into the connector socket. A short cable connection device may be more versatile than a longer one. In a cable connection device according to the invention, the connector may define an insertion direction for a cable plug. It may define an insertion direction by the shape of a receptacle, into which the cable plug can be inserted for mating. Generally, the middle portion of the conductor element may have a short extension, measured in an the direction of insertion of the plug into the connector socket, compared to the extension of the connector socket itself, in that direction. Specifically, the extension of the middle portion of the conductor element, in the insertion direction, may be less than the extension of the connector socket, in the insertion direction. In certain cable connection devices according to the invention, the extension of the middle portion of the conductor element, in the insertion direction, may be less than half of the extension of the connector socket, in the insertion direction.

A cable connection device according to the present invention may be advantageously used in conjunction with a power cable, equipped with a cable plug, as it allows for a more reliable connection of the power cable to an electrical installation. The present invention therefore provides, in one aspect, a cable assembly, comprising a cable connection device according to the invention as described above, a power cable having a power-carrying conductor and an insulating layer arranged around the power-carrying conductor, and a cable plug, attached to an end of the power-carrying conductor of the cable and mated with the connector socket of the cable connection device.

A power network, equipped with such a cable assembly, provides reliable power supply. The present invention therefore provides, in a further aspect, a power network for distributing electrical power at electrical current levels of at least 50 Ampere, comprising a cable assembly as described above.

The invention also provides a method of connecting a power cable to an electrical installation of a power network, comprising, in this sequence, the steps of
a) providing a power cable having a power-carrying conductor and a cable plug attached to an end of the power-carrying conductor;
b) providing a cable connection device comprising a conductor element having a first end portion, a second end portion, and a middle portion disposed between the first end portion and the second end portion, wherein the conductor element comprises a connector socket, arranged at the first end portion, for mating with the cable plug, and wherein the connector socket is integrally formed with the middle portion;
c) mating the cable plug with the connector socket.

Generally, if the cable connection device comprises a jacket having a cover portion which comprises shrinkable material, the method above may be varied such as to comprise, in this sequence, the steps of
a) providing a power cable (200, 201) having a power-carrying conductor (210) and a cable plug (90) attached to an end of the power-carrying conductor;
b) providing a cable connection device comprising a conductor element (10, 11) having a first end portion (20, 21), a second end portion (30, 31), and a middle portion (40, 41) disposed between the first end portion and the second end portion, wherein the conductor element comprises a connector socket (50), arranged at the first end portion, for mating with the cable plug (90), and wherein the connector socket is integrally formed with the middle portion, and wherein the cable connection device further comprises a jacket comprising a cover portion extending beyond the first end portion of the conductor element, the cover portion comprising shrinkable material;
c) mating the cable plug with the connector socket;
d) connecting the cable connection device to the electrical installation;
e) shrinking the shrinkable material.

The invention will now be described in more detail with reference to the following Figures exemplifying particular embodiments of the invention. The Figures are not to scale, and some dimensions, in particular some thicknesses of layers, are exaggerated for greater clarity.

Herein below various embodiments of the present invention are described and shown in the drawings wherein like elements are provided with the same reference numbers.

Figure 1:
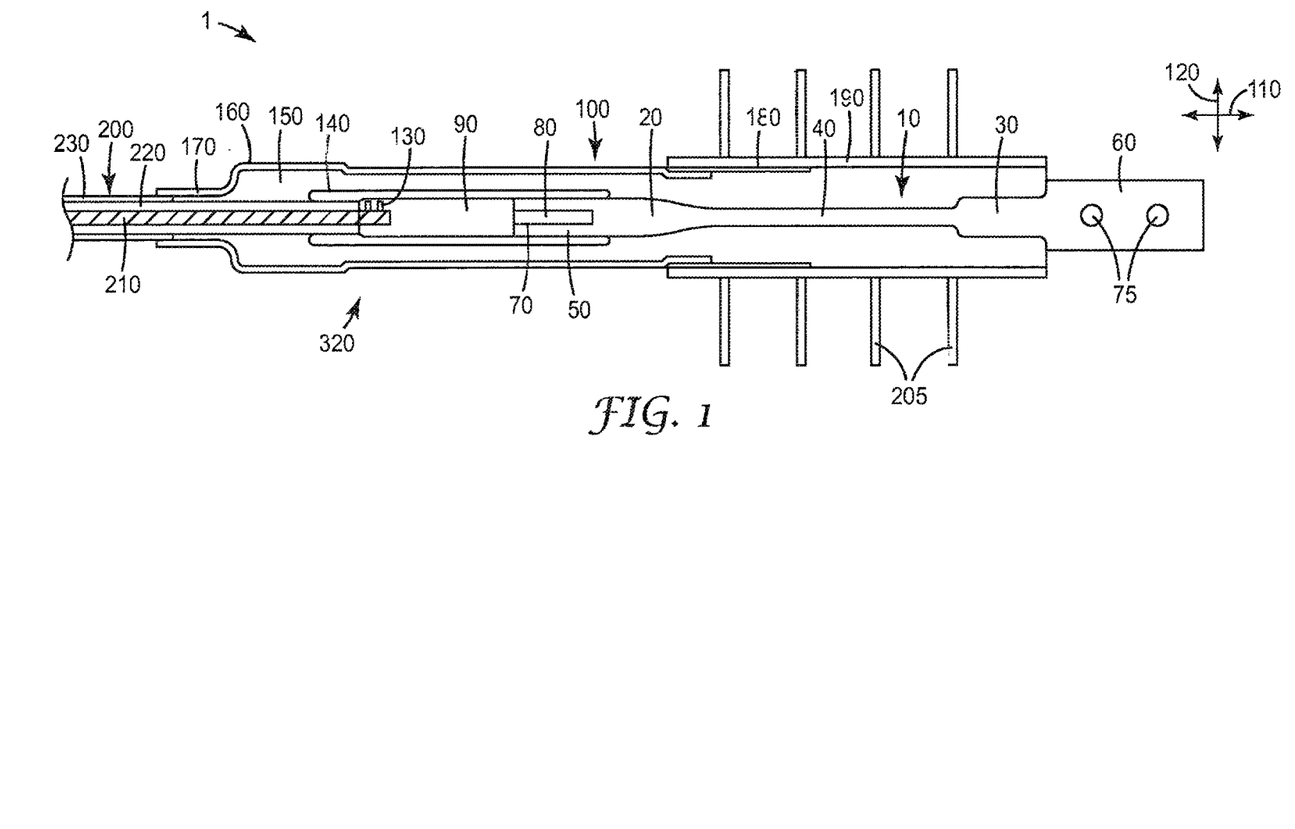
FIG. 1 Schematic longitudinal section of a first cable connection device according to the invention, connected to a cable.

FIG. 1 is a schematic longitudinal section of a first cable connection device according to the invention. In this embodiment, the connection device is a high-voltage cable termination 1. The cable termination 1 comprises an electrically conductive conductor element 10 and a jacket 100, arranged around the conductor element 10. The cable termination 1 terminates a high-voltage cable 200, i.e. it is connected to an end of the cable 200. The cable 200 is a high-voltage cable 200 which comprises a power-carrying inner conductor 210, an insulating layer 220 arranged around the inner conductor 210, a semiconductive layer 230, a shielding layer (not shown) and an insulating outer cable sheath (not shown). The end portion of the cable 200 is stripped, i.e. sections of layers have been removed, such as to expose, in specific sections, the inner conductor 210, the insulating layer 220, and the semiconductive layer 230.

The conductor element 10 has a first end portion 20, a second end portion 30, and a middle portion 40, disposed between the first end portion 20 and the second end portion 30. The conductor element 10 comprises a connector socket 50, which is arranged at the first end portion 20. The connector socket 50 is integrally formed with the middle portion 40 of the conductor element 10, i.e. they are one piece. Specifically, the conductor element 10 consists of a single piece of conductive aluminium, which is machined at its first end portion 20 to form the connector socket 50. Alternatively, copper might be used, or some other kind of conductive material.

The conductor element 10 is machined also at its second end portion 30 to form a cable lug 60. The lug 60 is thus also integrally formed with the middle portion 40 of the conductor element 10. The lug 60 has two fastening holes 75. The lug 60 is an attachment means for attaching the termination 1, and thereby the cable 200, to an electrical installation, like, for example, to a bushing in a switchgear. The portion of the lug 60 comprising the fastening holes 75 provides a flat surface, which is suitable for attachment to a corresponding flat surface of the electrical installation by screws which can pass through the fastening holes 75, so that large electrical currents can flow.

The conductor element 10 is sized to carry electrical power transmitted by the conductor 210 of the cable 200. In particular, the middle portion 40 is solid metal. Alternatively, the middle portion may, for example, be a stranded portion or a hollow portion. The transition area between the middle portion 40 and the first end portion 20 is formed such as to avoid sharp edges, which might cause electrical stress.

The conductor element 10 is elongate. Its first end portion 20 and its middle portion 40 have a circular cross section. The long extension of the conductor element 10 defines axial directions, indicated by a double arrow 110, and radial directions, indicated by a double arrow 120, perpendicular thereto. The first end portion 20 of the conductor element 10 has a cylindrical outer shape. The connector socket 50 comprises a cylindrical receptacle 70, formed in the first end portion 20. The receptacle 70 can receive a male mating portion 80 of a cable plug 90, which is arranged at an end of the conductor 210 of the cable 200. By inserting the mating portion 80 into the receptacle 70 of the connector socket 50, the cable plug 90 and the connector socket 50 are mated with each other. Mating engages the connector socket 50 with the cable plug 90 such that a permanent, irreversible mechanical connection is established.

The mating between the cable plug 90 and the connector socket 50 establishes a mechanical and electrical connection between the cable plug 90 and the connector socket 50 in such a way, that electrical current can flow, and electrical power can be transmitted, from the cable plug 90 to the connector socket 50, and, generally, from the cable 200 to the electrical installation.

Both the receptacle 70 of the connector socket 50 and the male mating portion 80 of the cable plug 90 have a circular cross section. The receptacle 70 comprises lamellae (not shown) to engage the male mating portion 80 in such a way that when mated, the cable plug 90 can be rotated relative to the connector socket 50 without affecting the mechanical engagement and the capability to transmit power. Separate connectors, that allow for rotation of a cable plug after engagement with the connector, are commercially available, e.g. from Pfisterer, headquartered in Winterbach, Germany, or from Swiss-based company Multi-Contact, Basel. An integrally formed connector socket 50, arranged at the first end portion 20 of the conductor element 10, can be formed according to such a separate connector. As a result, a cable plug 90, mated with such a connector socket 50, is rotatable relative to the connector socket 50.

In other embodiments, the engagement may be such that no rotation is possible. The ability to rotate is not essential for obtaining a more reliable cable termination 1. However, it may introduce additional flexibility in the process of installing the termination 1, with a cable 200 attached, to an electrical installation: If the cable 200 is stiff and requires large forces for torsion, the rotatable engagement between cable plug 90 and connector socket 50 may allow to rotate the cable termination 1, relative to the cable 200, into an orientation in which a flat surface of the cable lug 60 is parallel to a flat surface of the electrical installation, so that the lug 60 can be attached to the flat surface of the electrical installation with less effort.

The cable plug 90 is electrically conductive and can receive, at one end, the end of the power-carrying conductor 210 of the power cable 200. The cable plug 90 is attached to the conductor 210 by two screws 130. The middle portion of the cable plug 90, i.e. the portion between the cable connection portion and the male mating portion 80, is solid metal.

The jacket 100 is generally of a tubular shape and envelopes the conductor element 10, except for the portion of the lug 60 comprising the fastening holes 75. It extends axially to envelope also the cable plug 90 and an end portion of the power cable 200, when the cable plug 90 is mated with the connector socket 50. The jacket 100 has several layers, arranged coaxially, which have different axial extensions and fulfil different functions. The layers are molded from elastic silicone, or more generally, from elastic material(s). The layers are molded sequentially.

In an axial section of the jacket 100, the radially innermost layer of the jacket 100 is a cage electrode 140. The cage electrode 140 is formed by a layer of electrically conductive, elastic silicone. The cage electrode 140 is arranged concentrically around the connector socket 50 of the conductor element 10, radially outward of the connector socket 50 and directly on the connector socket 50, so that it is in mechanical and electrical contact with the connector socket 50. In use, the connector socket 50 is on the electrical potential of the cable conductor 210, and the cage electrode 140 is on the same potential. The cage electrode 140 extends axially far enough to also envelope the cable plug 90 and a portion of a cable insulation 220, when the plug 90 is mated with the connector socket 50, i.e. when the cable 200 is attached to the cable termination 1. In the opposite axial direction 110, the cage electrode 140 extends over a portion of the connector socket 50, far enough to cover any axial gap between the body of the cable plug 90 and the connector socket 50. The cage electrode 140 is configured to prevent detrimental effects of electrical stress, caused, for example, by air pockets and surface irregularities at interfaces between the cable 200, the cable plug 90, and the connector socket 50, that would occur if no cage electrode 140 were present.

The jacket 100 comprises an electrically insulating body layer 150, which surrounds the cage electrode 140, the first end portion 20, the middle portion 40 and an axial section of the second end portion 30 of the conductor element 10. The body layer 150 is arranged radially outward of the conductive element 10 and of the cage electrode 140. The body layer 150 extends, in both axial directions 110, axially further than the cage electrode 140. In one axial direction (to the left, in the Figure), it extends axially such as to envelope the cable plug 90 and an end portion of the power cable 200, when the cable plug 90 is mated with the connector socket 50. In the opposite axial direction (to the right, in the Figure), it extends axially such as to envelope the first end portion 20, the middle portion 40 and an axial section of the second end portion 30 of the conductor element 10. The body layer 150 is formed by a layer of elastic, electrically insulating silicone. In alternative embodiments, it may be comprise EPDM (ethylene propylene diene monomer). The body layer 150 is molded over the cage electrode 140 and the conductive element 10, but it might alternatively be applied by other methods, like, for example applied as an extruded pre-stretched tube.

The jacket 100 further comprises an outer conductive layer 160, coaxially arranged with other layers of the jacket 100 and with the conductor element 10. A first axial section of the outer conductive layer 160 surrounds the axial section of the body layer 150, which envelopes the cage electrode 140 and the end portion of the cable 200. A second axial section 170 extends axially further than the body layer 150 such as to envelope a portion of the cable 200, when the cable 200 is connected with the cable termination 1. The second axial section 170 is arranged coaxially on the cable 200 such as to mechanically and electrically contact the semiconductive layer 230 of the cable 200. The outer conductive layer 160 is thus on the same electrical potential as the semiconductive layer 230 of the cable 200, which is normally held at electrical ground.

The first axial section of the outer conductive layer 160 extends axially towards the second end portion 30 of the conductive element 10, up to the transition region between the first end portion 20 and the middle portion 40 of the conductive element 10. In the axial position of that transition region, the cross section of the outer conductive layer 160 is shaped such as to form a geometric stress control profile, which is designed to reduce electrical stress in that transition region.

The outer conductive layer 160 electrically functions as a continuation of the semiconductive layer 230 of the cable 200. It contributes to shaping the electrical field. The outer conductive layer 160 is made from conductive silicone. Alternatively, it might be made from, or comprise, EPDM (ethylene propylene diene monomer). The outer conductive layer 160 is elastic, i.e. it can be radially expanded and, once expanded, tends to regain its original, non-expanded shape.

The jacket 100 further comprises an electrically semiconductive stress control layer 180, arranged coaxially around the conductor element 10. It extends axially from the first end portion 20 to the middle portion 40 of the conductor element 10. A first axial section of the stress control layer 180 is arranged on the outer conductive layer 160, a second axial section of it is arranged on the insulating body layer 150. The stress control layer 180 comprises a so-called High-k material. Specifically, it comprises silicone containing carbon particles. It functions as refractive stress control element for reducing the risk of electrical discharges between the conductor element 10 and the outer conductive layer 160 which is at electrical ground.

The jacket 100 further comprises an outer insulating layer 190, made from electrically insulating silicone. It is arranged coaxially around the conductor element 10 and extends axially from the transition region between the first end portion 20 and the middle portion 40 of the conductor element 10 up to the second end portion 30 of the conductor element 10. A first axial section of the outer insulating layer 190 (the left-hand section, in the Figure) is arranged on the stress control layer 180. A second axial section (the right-hand section, in the Figure) is arranged on the body layer 150. The outer insulating layer 190 is shaped such as to form four skirts 205, protruding radially outward, which serve to reduce creeping currents from the exposed lug 60 to the outer conductive layer 160.

A portion 320 of the jacket 100, a cover portion 320, is adapted to envelope the cable plug 90 and the end portion of the cable 200, once the cable 200 is connected to the cable termination 1 by mating the cable plug 90 with the connector socket 50. The cover portion 320 extends axially beyond the first end portion 20 of the conductor element 10 and axially further such as to cover the cable plug 90 and the end portion of the cable 200, once the cable 200 is connected to the cable termination 1.

Figure 2:
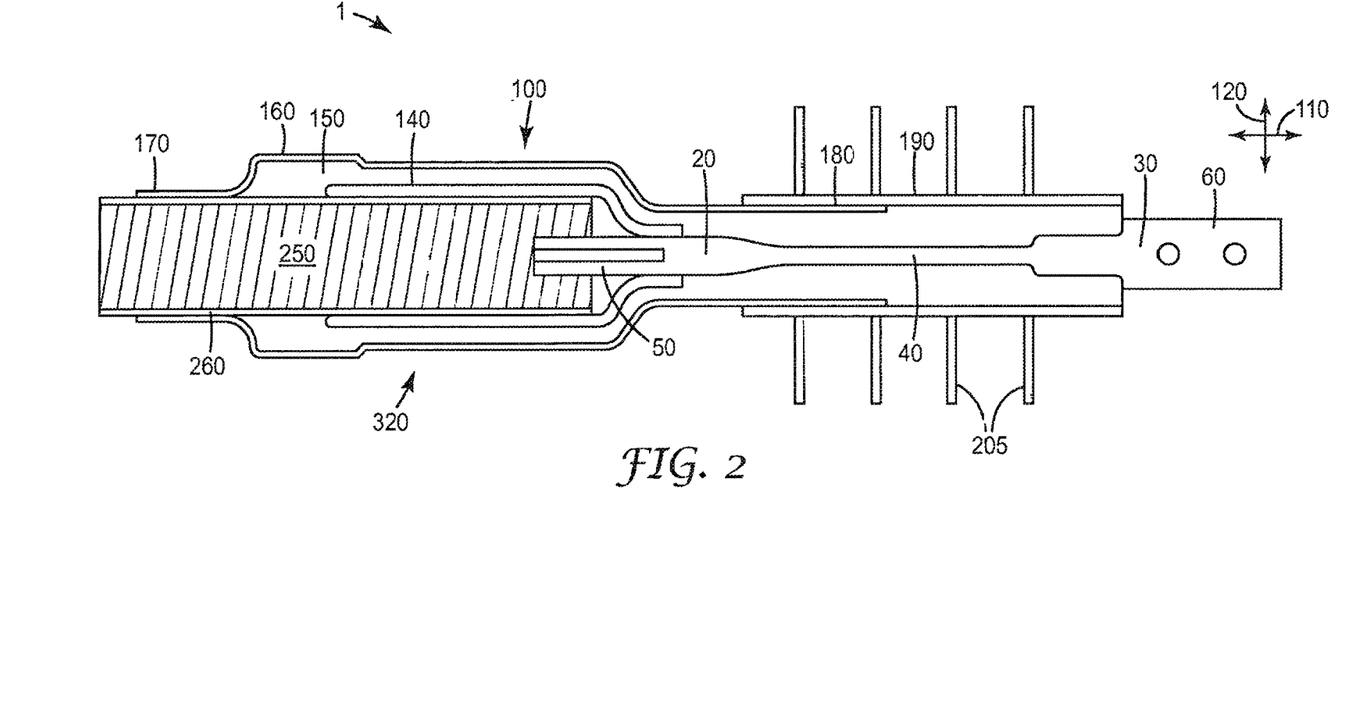
FIG. 2 Schematic longitudinal section of the cable connection device of FIG. 1, before connection to a cable, with expanded portion.

In FIG. 1, the cable termination 1 is shown with the cable 200 attached to it. FIG. 2 is a schematic longitudinal section of the cable termination 1 of FIG. 1 without the cable 200. The cable termination 1 is shown before the cable 200 is inserted and attached to the termination 1. On the cable side (the left side in FIGS. 1 and 2) of the termination 1, an axial portion of the jacket 100 is held in a radially expanded state by a tubular insert 250, which forms a hollow space. The radially expanded portion comprises the cover portion 320. The insert 250 comprises a wall 260 which is formed by axially adjacent turns of a polymer strip. The wall 260 holds the jacket 100 in a radially expanded state. While the jacket 100 is expanded, an end of a cable 200 can be inserted into the jacket 100, and a cable plug 90 on the end of the conductor 210 of the cable 200 can be mated with the connector socket 50 of the conductor element 10, whereby the cable 200 is attached to the termination 1. Once the cable 200 is attached, the polymer strip can be pulled out towards the open side of the hollow space, which makes the wall 260 gradually collapse from right to left (in the Figure). The previously expanded portion of the elastic jacket 100 gradually contracts or "shrinks" in the same direction, it "is shrunk down". Once the polymer strip forming the wall 260 is completely pulled out, the previously expanded portion of the jacket 100 has contracted around the connector socket 50, the cable plug 90 and the cable 200, which results in the arrangement shown in FIG. 1.

The connector socket 50 is of a self-mating type, in other words, it is adapted to be permanently mated with the cable plug 90 by inserting the cable plug 90 into the connector socket 50 in an axial direction 110. No further access to the connector 50 socket is required for secure mating of the cable plug 90 with the connector socket 50. Once mated with the connector socket 50, and before shrinking down the jacket 100, the cable plug 90 can be rotated relative to the connector socket 50 about an axis parallel to the insertion direction. After the cable plug 90 is mated to the connector socket 50, the jacket 100 can be shrunk down around the connector socket 50, the cable plug 90 and the end portion of the cable 200. The shrinking causes a tight fit of the jacket 100 around the cable 200 and the cable plug 90. The friction resulting from this tight fit prevents that the cable plug 90 and the cable 200 can be rotated relative to the connector socket 50 after shrinking.

Figure 3:
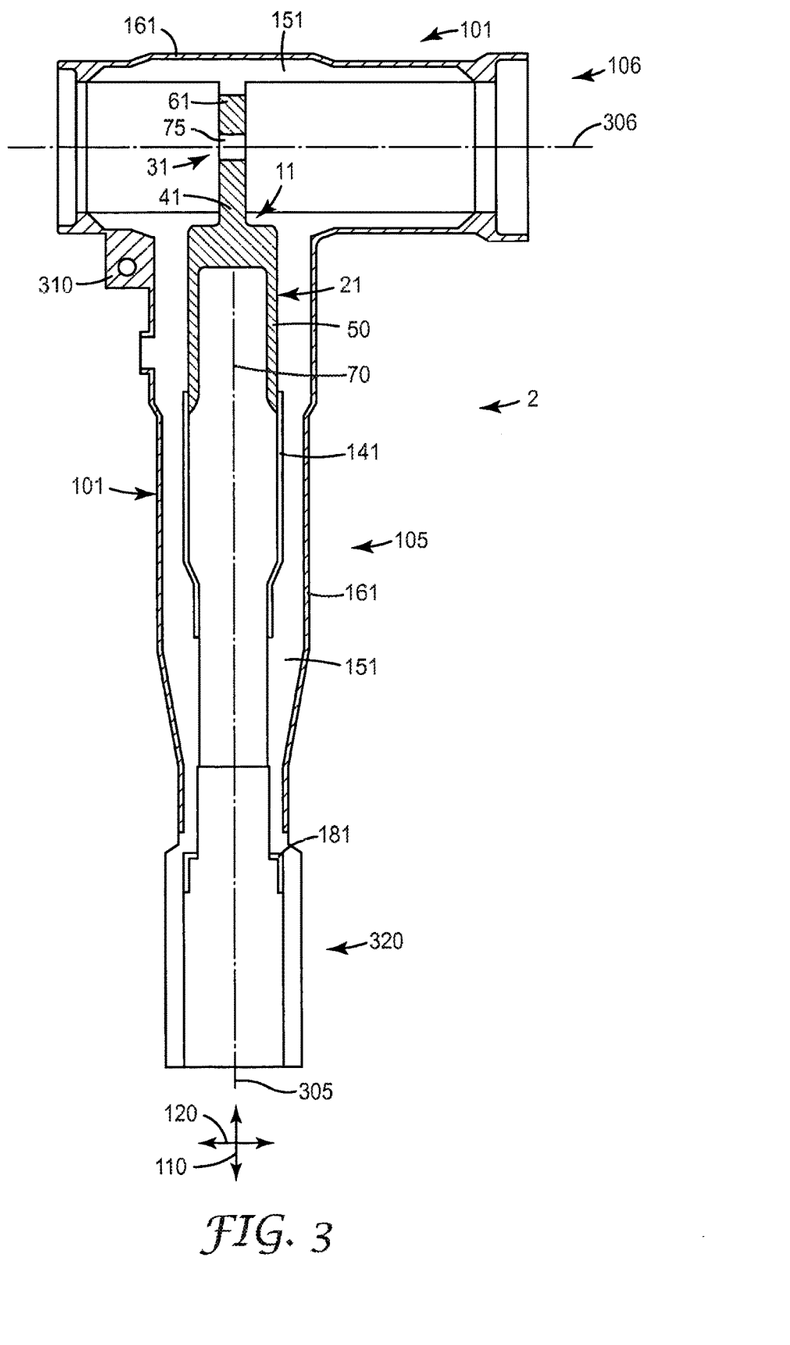
FIG. 3 Schematic longitudinal section of a second cable connection device according to the invention, as connected to a cable.

FIG. 3 is a schematic longitudinal section of a second cable connection device. This device is a separable elbow plug 2 for connecting a high-voltage power cable to a bushing of a switchgear in a power network. The elbow plug 2 is shown as it appears when attached to a cable and a cable plug, for example the cable 200 and the cable plug 90 shown in FIG. 1. However, for greater clarity, the cable 200 and the cable plug 90, are not drawn.

The elbow plug 2 is similar to the termination 1 of FIGS. 1 and 2 in many respects. Some features are different, however: The elbow plug 2 comprises an electrically conductive conductor element 11 and a jacket 101. The jacket 101 comprises a cable-side portion 105 and a bushing-side portion 106. Both portions 105, 106 are rotationally symmetric to some degree and thereby define respective axes: The axis 305 of the cable-side portion 105 is perpendicular to the axis 306 of the bushing-side portion 106. The cable-side portion 105 is generally of a tubular shape.

The conductor element 11 comprises a first end portion 21, a second end portion 31, and a middle portion 41, disposed between the first end portion 21 and the second end portion 31. The conductor element 11 comprises a connector socket 50, arranged at the first end portion 21. The connector socket 50 can be mated with a cable plug 90 (not shown) on the end of a power-carrying conductor 210 of a power cable 200, as explained in the context of FIG. 1. The connector socket 50 is integrally formed with the middle portion 41 of the conductor element 11. In other words, the middle portion 41 and the connector socket 50 are one piece. The conductor element 11 consists of a single piece of conductive copper, which is machined at its first end portion 21 to form the connector socket 50. The connector socket 50 defines an insertion direction, in which a cable plug can be inserted into the connector socket 50 for mating. The insertion direction is identical with the "long" direction of the cable.

The conductor element 11 is machined also at its second end portion 31 to form a cable lug 61. The lug 61 is thus also integrally formed with the middle portion 41 of the conductor element 11. The lug 61 has a fastening hole 75. The lug 61 is an attachment means for attaching the elbow plug 2, and a cable attached to the elbow plug 2, to a bushing in a switchgear, or more generally, to an electrical installation. The lug 61 provides a flat surface, which is suitable for attachment to a corresponding flat surface of the bushing by a screw which can pass through the fastening hole 75, so that large electrical currents can flow.

The conductor element 11 is elongate. Its first end portion 21 has a circular cross section. The long extension of the conductor element 11 defines axial directions, indicated by a double arrow 110, and radial directions, indicated by a double arrow 120, perpendicular thereto. Axial directions are parallel or antiparallel to the symmetry axis 305 of the cable-side portion 105 of the jacket 101. The first end portion 21 of the conductor element 11 has a cylindrical outer shape and a circular cross section. The connector socket 50 is arranged at the first end portion 21. The connector socket 50 has the same functionality as the connector socket 50 of the termination 1 of FIGS. 1 and 2. In particular, it also comprises a receptacle 70 for receiving a cable plug 90 for mating. By inserting a mating portion 80 of a cable plug 90 into the receptacle 70 of the connector socket 50, the cable plug 90 and the connector socket 50 are mated. Mating engages the connector socket 50 with the cable plug 90 such that a permanent, irreversible mechanical connection is established. The connector socket 50 also comprises lamellae (not shown), so that after mating the cable plug 90 can be rotated relative to the connector socket 50 without affecting the mechanical engagement and the capability to transmit power. This may be advantageous during installation of the elbow plug 2, as described above for the termination 1.

The conductor element 11 is sized to carry electrical power transmitted by the conductor 210 of the cable 200. In particular, the middle portion 41 is solid metal. Alternatively, the middle portion may, for example, comprise a hollow portion. The conductor element 11 is shorter, in axial direction 110, than the conductor element 10 of the termination 1 shown in FIG. 1. In particular, the axial extension of its middle portion 41 is shorter than the axial extension of the first end portion 21. In particular, the axial extension of the middle portion 41 is shorter than the axial extension of the connector socket 50. It is even shorter than half the axial extension of the connector socket 50. A short middle portion 41 results in an overall shorter elbow plug 2.

The jacket 101 is generally of an elbow shape and envelopes the conductor element 11. The jacket 101 extends, in axial directions 110, beyond the conductor element 11 such as to envelope also the cable plug 90 and an end portion of the power cable 200, when the plug 90 is mated with the connector socket 50. The jacket 101 has several layers, arranged coaxially, which have different axial extensions and fulfil different functions, most of them identical to the functions of corresponding layers in the termination described in FIGS. 1 and 2. The layers are molded from elastic silicone, or more generally, from elastic material(s), so that the jacket 101 is elastic. It can be radially expanded and once expanded, tends to regain its original, non-expanded shape.

In an axial section the cable-side portion 105 of the jacket 101, the radially innermost layer of the jacket 101 is a cage electrode 141. The cage electrode 141 is formed by a layer of electrically conductive, elastic silicone. The cage electrode 141 is arranged to be concentrically around a cable plug 90 mated with the connector socket 50 of the conductor element 11. An end portion of the cage electrode 141 is arranged radially outward of the connector socket 50 and directly on the connector socket 50, so that the cage electrode 141 is in mechanical and electrical contact with the connector socket 50. In use, the connector socket 50 is on the electrical potential of the cable conductor 210, and the cage electrode 141 is on the same potential. Similar to the cage electrode 140 in FIG. 1, the cage electrode 141 extends axially far enough to also envelope the cable plug 90 and a portion of a cable insulation 220, when the plug 90 is mated with the connector socket 50, i.e. when the cable 200 is attached to the elbow plug 2. In the opposite axial direction (upwards, in FIG. 3), the cage electrode 141 extends over a portion of the connector socket 50, far enough to cover any axial gap between the body of the cable plug 90 and the connector socket 50. The cage electrode 141 is designed to prevent detrimental effects of electrical stress, caused, for example, by air pockets and surface irregularities at interfaces between the cable 200, the cable plug 90, and the connector socket 50, that would occur if no cage electrode 141 were present.

The jacket 101 comprises an electrically insulating body layer 151, which surrounds the cage electrode 141, the first end portion 21, and the middle portion 41. The body layer 151 also surrounds the second end portion 31 of the conductor element 11. The bushing-side portion 106 of the jacket 101 and the body layer 151 in that portion 106 have a tubular shape such that the lug 61 can be accessed from two opposite directions, along the axis 306 of the bushing-side portion 106. In the cable-side portion 105, the body layer 151 is arranged radially outward of the conductive element 11 and of the cage electrode 141. The body layer 151 extends, in both axial directions 110, axially further than the cage electrode 141. In one axial direction (towards the bottom, in FIG. 3), it extends axially such as to envelope the cable plug 90 and an end portion of the power cable 200, when the cable plug 90 is mated with the connector socket 50. In the opposite axial direction (towards the top, in FIG. 3), it extends axially such as to form the bushing-side portion 106 of the jacket 101. The body layer 151 is formed by a layer of electrically insulating silicone. The body layer 151 is molded over the cage electrode 141 and the conductive element 11.

The jacket 101 further comprises an outer conductive layer 161. The outer conductive layer 161 is arranged on the outer surface of the body layer 151. In the cable-side portion 105 of the jacket 101, the outer conductive layer 161 surrounds the body layer 151, which envelopes the cage electrode 141 and the end portion of the cable 200. In the bushing-side portion 106 of the jacket 101, the outer conductive layer 161 surrounds the body layer 151, which envelopes the lug 61. The entire elbow plug 2, except for a distal portion 320 of the jacket 101 for contacting the cable 200, is enveloped in the outer conductive layer 161. The outer conductive layer 161 thereby provides electrical shielding and makes the elbow plug 2 safe to touch. The outer conductive layer 161 is made from conductive silicone. Alternatively, it might be made from, or comprise, EPDM (ethylene propylene diene monomer).

Unlike in the termination 1 of FIG. 1, the outer conductive layer 161 does not electrically contact the semiconductive layer 230 of the cable. In the elbow plug 2, the outer conductive layer 161 is electrically grounded in a different manner. For that purpose, a grounding wire can be connected to the elbow plug 2 at a grounding contact 310, which is in electrical contact with the outer conductive layer 161. The conductive layer 161 is continuous in that all portions of it are connected with each other electrically and mechanically.

The jacket 101 further comprises an electrically semiconductive stress control layer 181, arranged coaxially in the distal portion 320 of the jacket 101. The stress control layer 181 comprises a so-called High-k material. Specifically, it comprises silicone containing carbon particles. It functions as refractive stress control element for reducing the risk of electrical discharges in the area where the semi-conductive layer 230 of the cable (not shown) ends, when the cable 200 is inserted into the elbow plug 2, and when the cable plug 90, on the end of a cable conductor 210, is mated with the connector socket 50.

In order to be usable with the elbow plug 2, a cable needs to be stripped differently from a cable that was stripped in order to work with the termination 1 of FIG. 1. In particular, the semiconductive layer of the cable (corresponding to the semiconductive layer 230 in the cable 200 described earlier) must be exposed suitably such that it can mechanically and electrically contact the stress control layer 181, once the cable-end portion 105 of the elbow plug 2 has been shrunk over the cable end and the cable plug 90.

The connector socket 50 formed integrally with the middle portion 41 at the first end portion 21 of the conductor element 11 is identical to the connector socket 50 of the termination 1 described earlier. In particular, it is self-mating, i.e. it is adapted to be permanently mated with the corresponding cable plug 90 by inserting the cable plug 90 into the connector socket 50 in an axial direction 110. The connector socket 50 defines an insertion direction. Also, the connector socket 50 is adapted such that the cable plug, when mated with the connector socket 50, can be rotated relative to the connector socket 50 about an axis which is parallel to the insertion direction, which in turn is an axial direction 110, and which is also parallel to the axis 305 of the cable-side portion 105 of the jacket 101.

Figure 4:
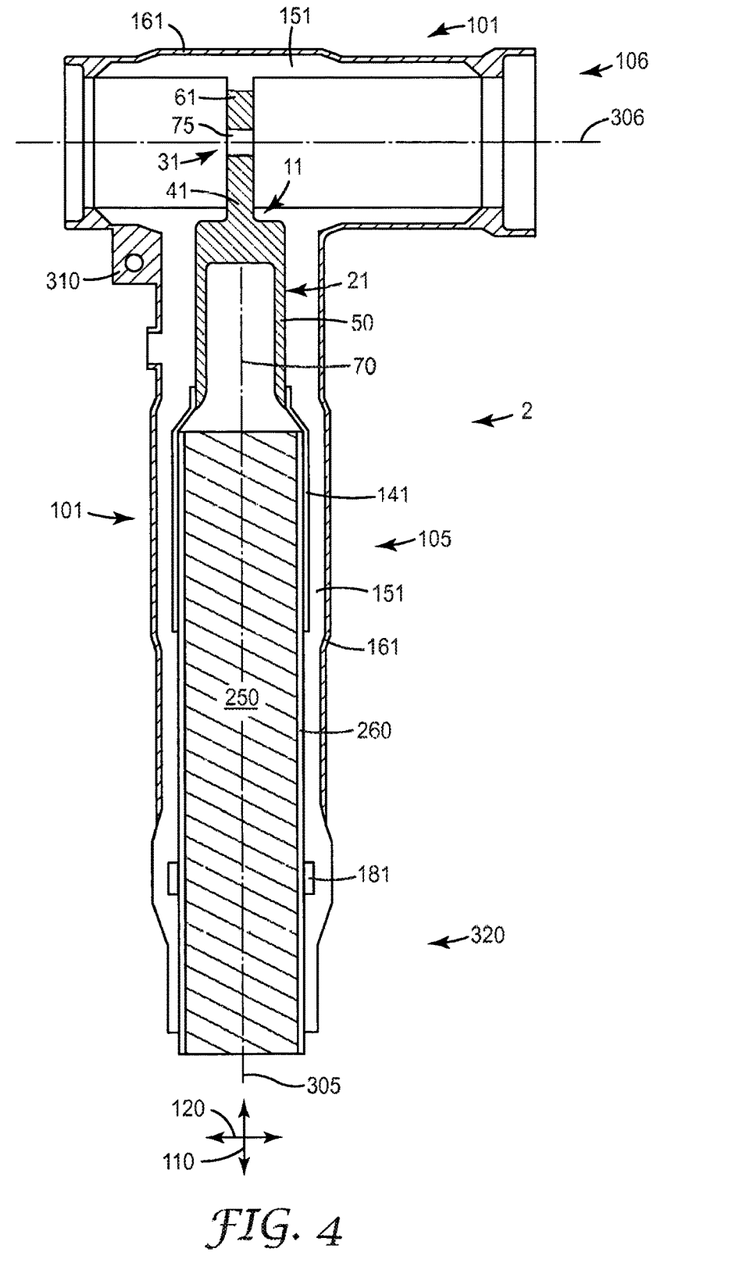
FIG. 4 Schematic longitudinal section of the second cable connection device of FIG. 3, before connection to a cable, with expanded portion.

As shown for the termination 1 in FIG. 2, the cable-side portion 105 of the jacket 101 can be held in an expanded state, so that a suitably stripped cable end, with a cable plug 90 on an inner conductor 210 of the cable 200, can be inserted into the elbow plug 2. This is illustrated in FIG. 4, which is a schematic longitudinal section of the separable elbow plug 2 of FIG. 3, before a cable is connected, and with a portion of the jacket 101 being held in a radially expanded state by a tubular insert 250, which forms a hollow space. The insert 250 comprises a wall 260 which is formed by axially adjacent turns of a polymer strip, which are connected with each other such that they can be separated by pulling on the polymer strip. The wall 260 holds the jacket 101 in a radially expanded state. While the jacket 101 is expanded, an end of a cable 200 can be inserted into the jacket 101, and a cable plug 90 on the end of the inner conductor 210 of the cable 200 can be mated with the connector socket 50 of the conductor element 11, whereby the cable 200 is attached to the elbow plug 2. Once the cable 200 is attached, the polymer strip can be pulled out towards the open side of the hollow space, which makes the wall 260 gradually collapse from top to bottom (in the Figure). The previously expanded portion of the jacket 101 gradually contracts or "shrinks" in the same direction, it "is shrunk down". Once the polymer strip forming the wall 260 is completely pulled out, the previously expanded portion of the jacket 101 has contracted around the connector socket 50, the cable plug 90 and the end portion of the cable 200, which results in the arrangement shown in FIG. 3.

While the elastic jacket 101 is expanded, an end of the cable 200 can be inserted into the jacket 101, and a cable plug 90 on the end of the conductor 210 of the cable 200 can be mated with the connector socket 50 of the conductor element 11, whereby the cable is attached to the elbow plug 2. After the cable plug 90 is mated to the connector socket 50, the jacket 101 can be shrunk down around the connector socket 50, the cable plug 90 and the end portion of the cable 200. The shrinking causes a tight fit of the jacket 101 around the cable 200 and the cable plug 90. The friction resulting from this tight fit prevents that the cable plug 90 and the cable 200 can be rotated relative to the connector socket 50 after shrinking.

Figure 5:
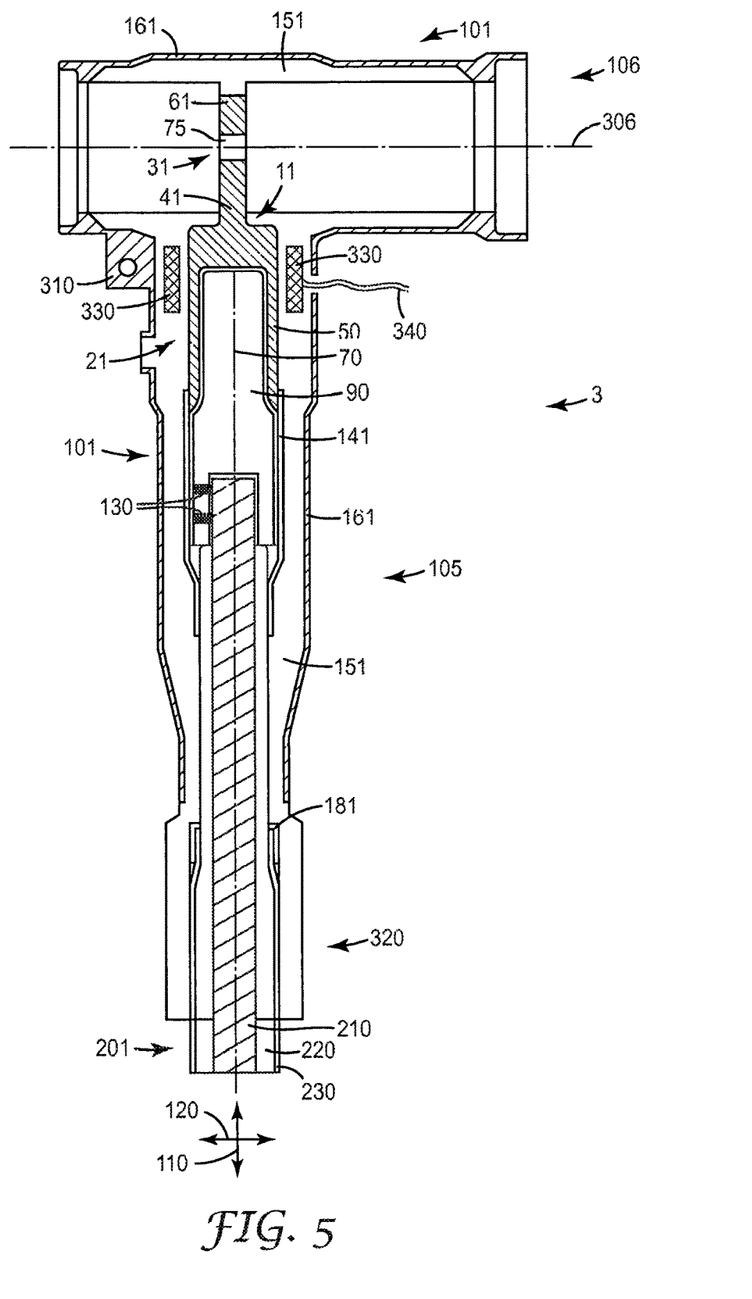
FIG. 5 Schematic longitudinal section of a third cable connection device according to the invention, comprising a voltage sensor, and connected to a cable.

FIG. 5 is a schematic longitudinal section of a third cable connection device according to the invention. In this embodiment, the cable connection device is a further separable elbow plug 3. The elbow plug 3 is shown with a high-voltage power cable 201 with a cable plug 90 attached to the elbow plug 3. The cable 201 comprises power-carrying inner conductor 210 or cable conductor 210, an insulating layer 220 arranged on and around the inner conductor 210, a semi-conductive layer 230, a shielding layer (not shown) and an insulating outer cable sheath (not shown). The end portion of the cable 201 is stripped, i.e. axial sections of cable layers have been removed, such as to expose, in specific sections, the inner conductor 210, the insulating layer 220, and the semiconductive layer 230. A cable plug 90, identical to the cable plug 90 in FIG. 1, is attached to the end of the cable conductor 210 and secured thereto by two screws 130. The cable plug 90 is shown mated with the connector socket 50.

The elbow plug 3 of FIG. 5 is identical to the elbow plug 2 of FIGS. 3 and 4, except that it comprises a voltage sensor for sensing a voltage of the inner conductor 210. The voltage sensor comprises a sensing electrode 330, arranged concentrically around the first end portion 21 of the conductor element 11. Alternatively, the sensing electrode 330 may be arranged concentrically around the middle portion 11, or partially around the middle portion 11 and partially around the first end portion 21. The sensing electrode 330 is operable as a first capacitor electrode of a sensing capacitor, which sensing capacitor comprises the cable conductor 210 as the second capacitor electrode. A portion of the body layer 151, which is arranged between the sensing electrode 330 and the conductor element 11, is operable as a dielectric of the sensing capacitor. The sensing capacitor is operable as a first dividing capacitor of a capacitive voltage divider, which comprises a second dividing capacitor and which, in turn, is comprised in the voltage sensor. By determining the voltage signal of the capacitive voltage divider, the voltage of the cable conductor 210 over electrical ground can be determined. The voltage of the sensing electrode 330 is transmitted through an opening in the outer conductive layer 161 by a wire 340, which makes the voltage of the sensing electrode 330 available outside the jacket 101 of the elbow plug 3.

The invention claimed is:

1. Cable connection device for connecting a power cable to an electrical installation of a power network, the cable connection device comprising a conductor element having a first end portion, a second end portion, and a middle portion disposed between the first end portion and the second end portion,
wherein the conductor element comprises a connector socket, arranged at the first end portion, for mating with a cable plug,
characterized by the connector socket being integrally formed with the middle portion,
wherein the connector socket further includes a plurality of electrically conductive lamellae for engaging in the cable plug within the connector socket and to maintain electrical contact during rotation of the cable plug.

2. Cable connection device according to claim 1, comprising an electrically conductive or semiconductive cage electrode, arranged around at least a portion of the connector socket.

3. Cable connection device according to claim 1, wherein the connector socket is adapted such that the cable plug, when mated with the connector socket, can be rotated relative to the connector socket.

4. Cable connection device according to claim 1, wherein the connector socket is adapted to be permanently mated with the cable plug by inserting the cable plug into the connector socket.

5. Cable connection device according to claim 1, wherein the connector socket defines an insertion direction for a cable plug, and in which the extension of the middle portion of the conductor element, in the insertion direction, is less than half of the extension of the connector socket, in the insertion direction.

6. The cable connection device according to claim 1, wherein the second end portion is configured to form a cable lug.

7. Cable connection device according to claim 1, comprising attachment means, arranged at the second end portion of the conductor element, for attaching the cable connection device to the electrical installation.

8. Cable connection device according to claim 7, wherein the attachment means is/are integrally formed with the middle portion.

9. Cable connection device according to claim 1, comprising a jacket, arranged around at least a part of the middle portion and at least a part of the first end portion.

10. Cable connection device according to claim 9, wherein the jacket comprises a cover portion extending axially beyond the first end portion of the conductor element.

11. Cable connection device according to claim 9, wherein the jacket comprises an electrically insulating layer.

12. Cable connection device according to claim 1, comprising a sensing electrode, operable as an electrode of a sensing capacitor for sensing a voltage of the power-carrying conductor of the power cable.

13. Cable connection device according to claim 12, wherein at least a portion of the sensing electrode is arranged radially outward of at least a portion of the connector socket.

14. Cable assembly, comprising
a cable connection device according to claim 1,
a power cable having a power-carrying conductor and an insulating layer, arranged around the power-carrying conductor,
a cable plug, attached to an end of the power-carrying conductor of the cable and mated with the connector socket of the cable connection device.

15. Power network for distributing electrical power at electrical current levels of at least 50 Ampere, comprising a cable assembly according to claim 14.

16. Method of connecting a power cable to an electrical installation of a power network, comprising, in this sequence, the steps of
a) providing a power cable having a power-carrying conductor and a cable plug attached to an end of the power-carrying conductor;
b) providing a cable connection device comprising a conductor element having a first end portion, a second end portion, and a middle portion disposed between the first end portion and the second end portion, wherein the conductor element comprises a connector socket, arranged at the first end portion, for mating with the cable plug, and wherein the connector socket is integrally formed with the middle portion, wherein the connector socket further includes a plurality of electrically conductive lamellae for engaging in the cable plug within the connector socket and to maintain electrical contact during rotation of the cable plug;
c) mating the cable plug with the connector socket.

* * * * *

UNITED STATES PATENT AND TRADEMARK OFFICE
CERTIFICATE OF CORRECTION

PATENT NO. : 10,027,071 B2
APPLICATION NO. : 14/898801
DATED : July 17, 2018
INVENTOR(S) : Mark Gravermann It is certified that error appears in the above-identified patent and that said Letters Patent is hereby corrected as shown below:

On the Title Page

Column 1 ((72) Inventors)
Line 5, Delete "Erkelelenz" and insert -- Erkelenz --, therefor.

Page 2 Column 1 ((57) Abstract continued)
Line 1, After "socket" insert -- , --.

In the Specification

Column 7
Line 42 (Approx.), After "in" delete "an".

In the Claims

Column 18
Line 6, In Claim 6, delete "lug." and insert -- plug. --, therefor.

Signed and Sealed this
Twentieth Day of November, 2018

Andrei Iancu
*Director of the United States Patent and Trademark Office*